US011089216B2

(12) United States Patent
Wang

(10) Patent No.: US 11,089,216 B2
(45) Date of Patent: Aug. 10, 2021

(54) IMAGE PROCESSING APPARATUS AND IMAGE PROCESSING METHOD

(71) Applicant: PANASONIC INTELLECTUAL PROPERTY MANAGEMENT CO., LTD., Osaka (JP)

(72) Inventor: Qinhe Wang, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 39 days.

(21) Appl. No.: 16/605,689

(22) PCT Filed: Dec. 26, 2017

(86) PCT No.: PCT/JP2017/046585

§ 371 (c)(1),
(2) Date: Oct. 16, 2019

(87) PCT Pub. No.: WO2018/207402

PCT Pub. Date: Nov. 15, 2018

(65) Prior Publication Data

US 2020/0120274 A1 Apr. 16, 2020

(30) Foreign Application Priority Data

May 12, 2017 (JP) ............................ JP2017-095426

(51) Int. Cl.
*H04N 5/232* (2006.01)

(52) U.S. Cl.
CPC ............................... *H04N 5/23238* (2013.01)

(58) Field of Classification Search
CPC .................................................. H04N 5/23238
See application file for complete search history.

(56) References Cited

U.S. PATENT DOCUMENTS 5,642,168 A 6/1997 Masaki
2012/0249729 A1 10/2012 Miyamoto et al.
(Continued)

FOREIGN PATENT DOCUMENTS

JP 08-125844 5/1996
JP 09-093430 4/1997
(Continued)

OTHER PUBLICATIONS

International Search Report issued in International Patent Application No. PCT/JP2017/046585, dated Feb. 6, 2018.
(Continued)

*Primary Examiner* — Michael E Teitelbaum
(74) *Attorney, Agent, or Firm* — Greenblum & Bernstein, P.L.C.

(57) ABSTRACT

Disclosed is an image processing apparatus in which an image receiver receives a plurality of captured images, where image-captured ranges partially overlap, from an image-capturing device and stores the plurality of captured images in an input buffer, a composite region setter sets a composite region such that a portion projected in the vicinity of a polar point of a celestial sphere panoramic image is wider than a portion projected in the vicinity of an equator of the celestial sphere panoramic image, in an overlapping image-captured range of at least two captured images, an image composer performs composite processing on overlapping images in the composite region, connects the plurality of captured images, generates the celestial sphere panoramic image, and stores the generated image to an output buffer, and an image transmitter transmits the celestial sphere panoramic image to a display device.

15 Claims, 12 Drawing Sheets

(56) References Cited

U.S. PATENT DOCUMENTS

2014/0071227 A1 3/2014 Takenaka et al.
2014/0267593 A1* 9/2014 Kim ..................... H04N 1/3876 348/36
2014/0267594 A1 9/2014 Furumura et al.
2016/0050369 A1* 2/2016 Takenaka .............. G06T 3/4038 348/222.1
2016/0234437 A1 8/2016 Kuwada et al.

FOREIGN PATENT DOCUMENTS

JP 2006-119730 5/2006
JP 2012-213041 11/2012
JP 5842886 1/2016
JP 2016-146543 8/2016
WO 2013/069050 5/2013
WO 2015/141605 A1 9/2015

OTHER PUBLICATIONS

The Extended European Search Report dated Feb. 10, 2020 for the related European Patent Application No. 17909236.6.

* cited by examiner

IMAGE PROCESSING APPARATUS AND IMAGE PROCESSING METHOD

TECHNICAL FIELD

The present disclosure relates to an image processing apparatus and an image processing method for compositing a plurality of captured images that partially overlap.

BACKGROUND ART

A technique for generating a panoramic image by connecting captured images, each of which is imaged by each of a plurality of cameras, to one another is widespread. However, since image-capturing conditions of respective cameras are different, when the captured images are connected as they are, seams are generated in connection portions of the panoramic image. Therefore, PTL 1 makes the seams of the connection portions in the panoramic image inconspicuous, by changing the tones of pixels of two captured images to be connected and overlapping portions of the two captured images.

CITATION LIST

Patent Literature

PTL 1: Japanese Patent Unexamined Publication No. 9-93430

SUMMARY OF THE INVENTION

However, in a case of generating a celestial sphere panoramic image in which a viewpoint is directed in any direction, the technique of PTL 1 has a problem that when the viewpoint is directed in a specific direction (upward or downward direction in PTL 1), the seams of the connection portions of the celestial sphere panoramic image is conspicuous. This is because, when composing a plurality of captured images to generate a celestial sphere panoramic image, there are coordinates that are integrated into one point in the celestial sphere panoramic image. That is, in a vicinity of such coordinates, a result of a correction is also integrated in a narrow range, and an effect of the correction cannot be obtained sufficiently.

The present disclosure aims to provide a technique for generating a celestial sphere panoramic image in which seams of connection portions are inconspicuous.

According to an aspect of the present disclosure, there is provided an image processing apparatus that generates a celestial sphere panoramic image by connecting a plurality of captured images to one another of which image-captured ranges partially overlap one another, the apparatus including: a composite region setter that sets a composite region such that a portion projected in the vicinity of a polar point of the celestial sphere panoramic image is wider than a portion projected in the vicinity of an equator of the celestial sphere panoramic image, in the overlapping image-captured ranges of at least two captured images; and an image composer that performs composite processing on the overlapping images in the composite region, connects the plurality of captured images to one another, and generates the celestial sphere panoramic image.

According to the present disclosure, it is possible to generate a celestial sphere panoramic image in which seams of connection portions are inconspicuous.

DESCRIPTION OF EMBODIMENT

Figure 1:
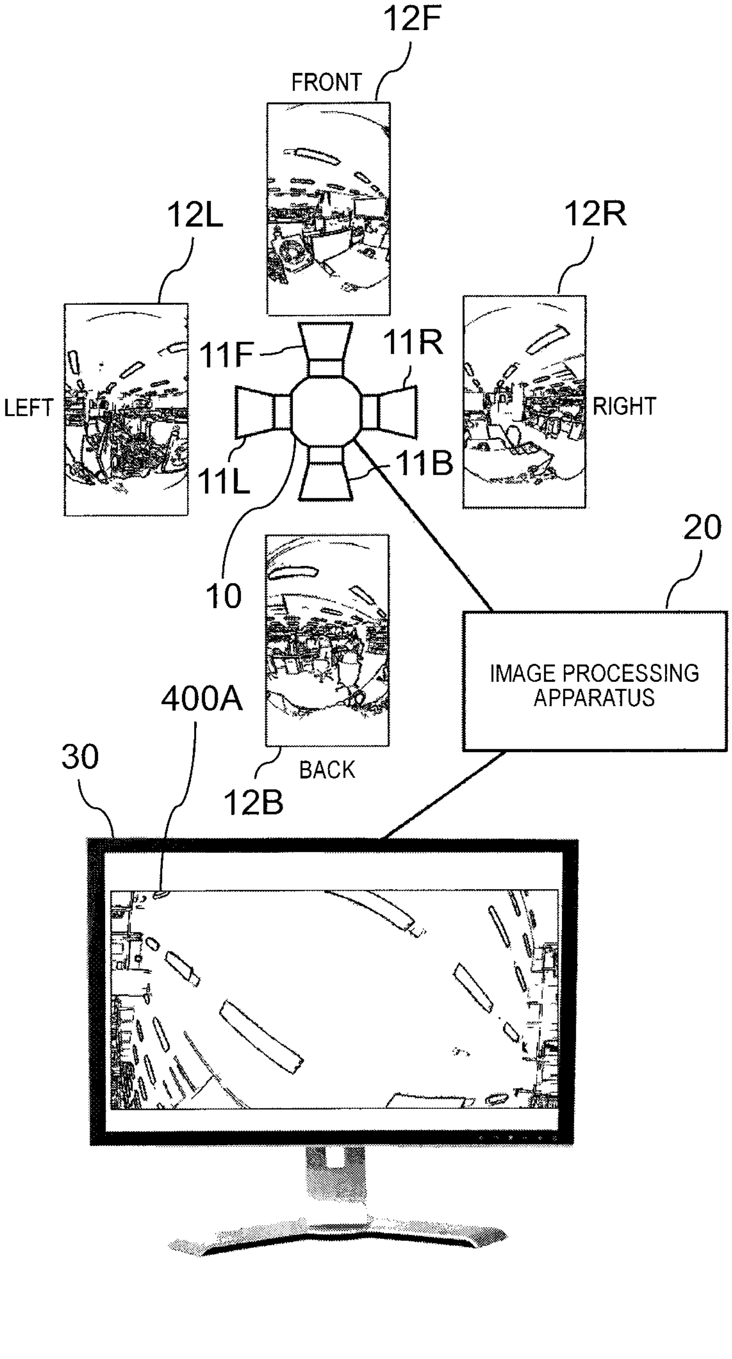
FIG. 1 is a schematic diagram showing an example of an image processing system using an image processing apparatus.

Hereinafter, an exemplary embodiment will be described with reference to the drawings.

In a case of explaining with distinguishing the same kind of elements, reference numerals such as “camera 11F” and “camera 11R” are used, and in a case of explaining without distinguishing the same kind of elements, only the common number among the reference numerals may be used such as “camera 11”.

<Image Processing System>

First, a configuration of an image processing system according to the present exemplary embodiment will be described using FIG. 1. The image processing system includes image-capturing device 10, image processing apparatus 20, and display device 30.

Image-capturing device 10 includes a plurality of cameras 11F, 11R, 11B, and 11L. Two adjacent cameras 11 are disposed such that image-captured ranges partially overlap. For example, in FIG. 1, camera 11F for imaging a front side and camera 11R for imaging a right side are disposed such that the image-captured ranges partially overlap. Image-capturing device 10 transmits captured images 12 imaged by each camera 11 to image processing apparatus 20 via a predetermined cable (or a network).

Image processing apparatus 20 stitches (panoramic composition) a plurality of captured images 12 received from image-capturing device 10 to generate celestial sphere panoramic image 400A. Celestial sphere panoramic image 400A is an image capable of moving a viewpoint in upward and downward directions in addition to front, back, left, and right directions. Image processing apparatus 20 transmits generated celestial sphere panoramic image 400A to display device 30 via a predetermined cable (or a network).

Display device 30 displays celestial sphere panoramic image 400A which is received from image processing apparatus 20. When a user inputs a viewpoint direction to image processing apparatus 20, image processing apparatus 20 generates celestial sphere panoramic image 400A that can be seen in the input viewpoint direction and displays generated celestial sphere panoramic image 400A on display device 30. For example, when the user inputs an upward direction viewpoint to image processing apparatus 20, image processing apparatus 20 displays celestial sphere panoramic image 400A that can be seen on an upper side from a position of image-capturing device 10, as shown in FIG. 1.

In the present exemplary embodiment, although it is described that image-capturing device 10 includes four cameras, the number of cameras included in image-capturing device 10 is not limited thereto. For example, image-capturing device 10 may include two, three, or five or more cameras.

Captured images 12 may be still images or moving images. In a case of moving images, captured images 12 in the present exemplary embodiment may be one frame constituting the moving images.

<Image Processing Apparatus>

Figure 2:
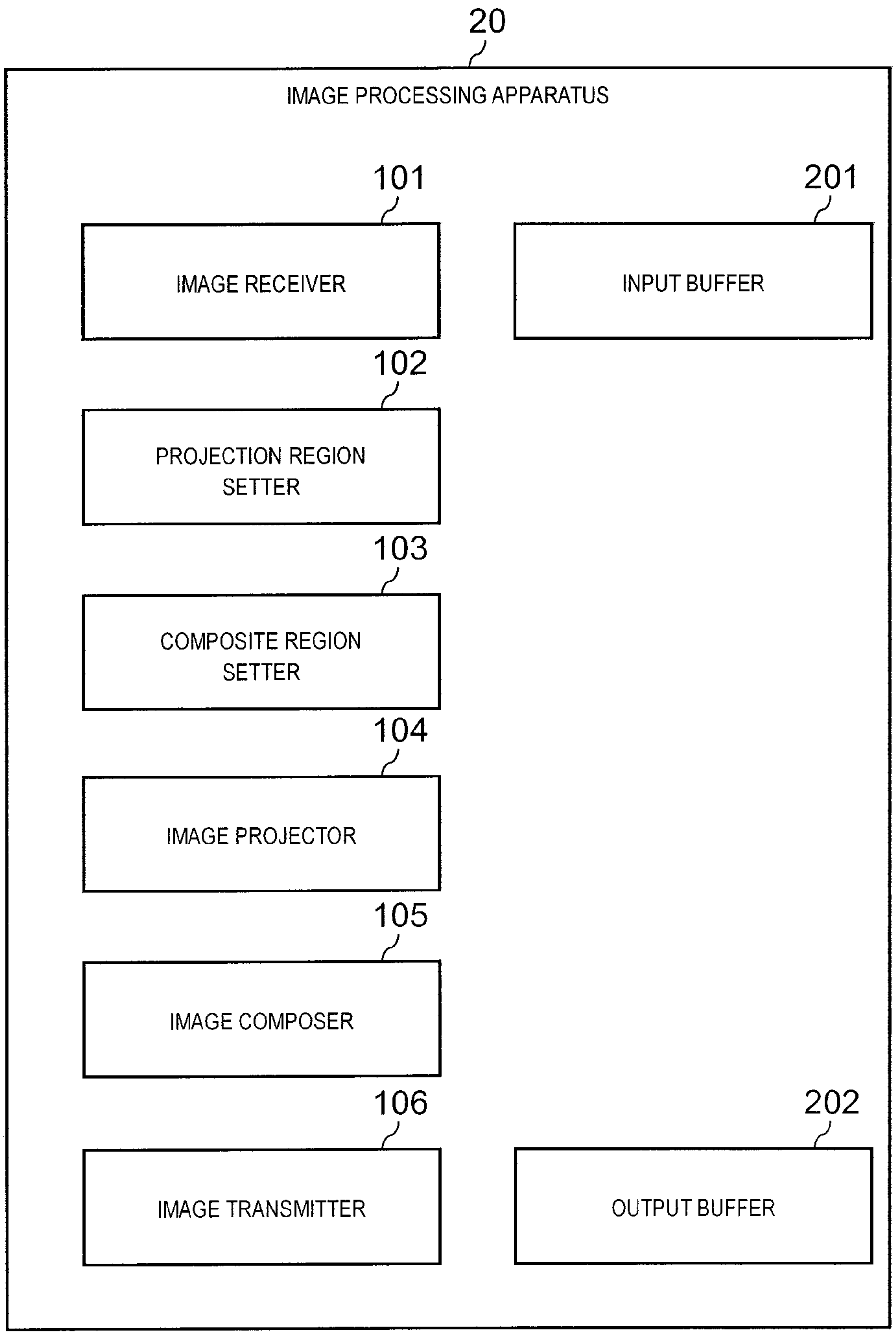
FIG. 2 is a block diagram showing an example of functions of the image processing apparatus.

Next, functions of image processing apparatus 20 will be described with reference to FIG. 2. Image processing apparatus 20 has image receiver 101, projection region setter 102, composite region setter 103, image projector 104, image composer 105, and image transmitter 106. Image processing apparatus 20 also includes input buffer 201 for temporarily storing data of a captured image transmitted from image-capturing device 10, and output buffer 202 for temporarily storing data of celestial sphere panoramic image 400 to be transmitted to display device 30.

Image receiver 101 receives the captured images imaged by each camera 11 from image-capturing device 10, and stores the received captured images in input buffer 201.

Projection region setter 102 sets a correspondence relationship between camera 11 and a projection region on which a captured image imaged by camera 11 is projected. A specific example of the processing performed by projection region setter 102 will be described later.

Composite region setter 103 sets a composite region near a boundary line of the adjacent projection regions, and sets an extended projection region in which the projection region and the composite region are combined. A specific example of the processing performed by composite region setter 103 will be described later.

Image projector 104 maps the captured image to the extended projection region. A specific example of the processing performed by image projector 104 will be described later.

Image composer 105 performs composite processing on images within the composite region, connects the images of two adjacent expanded projection regions, and generates celestial sphere panoramic image 400. Image composer 105 stores the generated celestial sphere panoramic image 400 in output buffer 202. A specific example of the processing performed by image composer 105 will be described later.

Image transmitter 106 transmits celestial sphere panoramic image 400 stored in output buffer 202 to display device 30. Thereby, celestial sphere panoramic image 400 is displayed on display device 30.

<Details of Projection Region Setter>

Next, a specific example of the processing performed by projection region setter 102 will be described with reference to FIG. 3.

Figure 3:
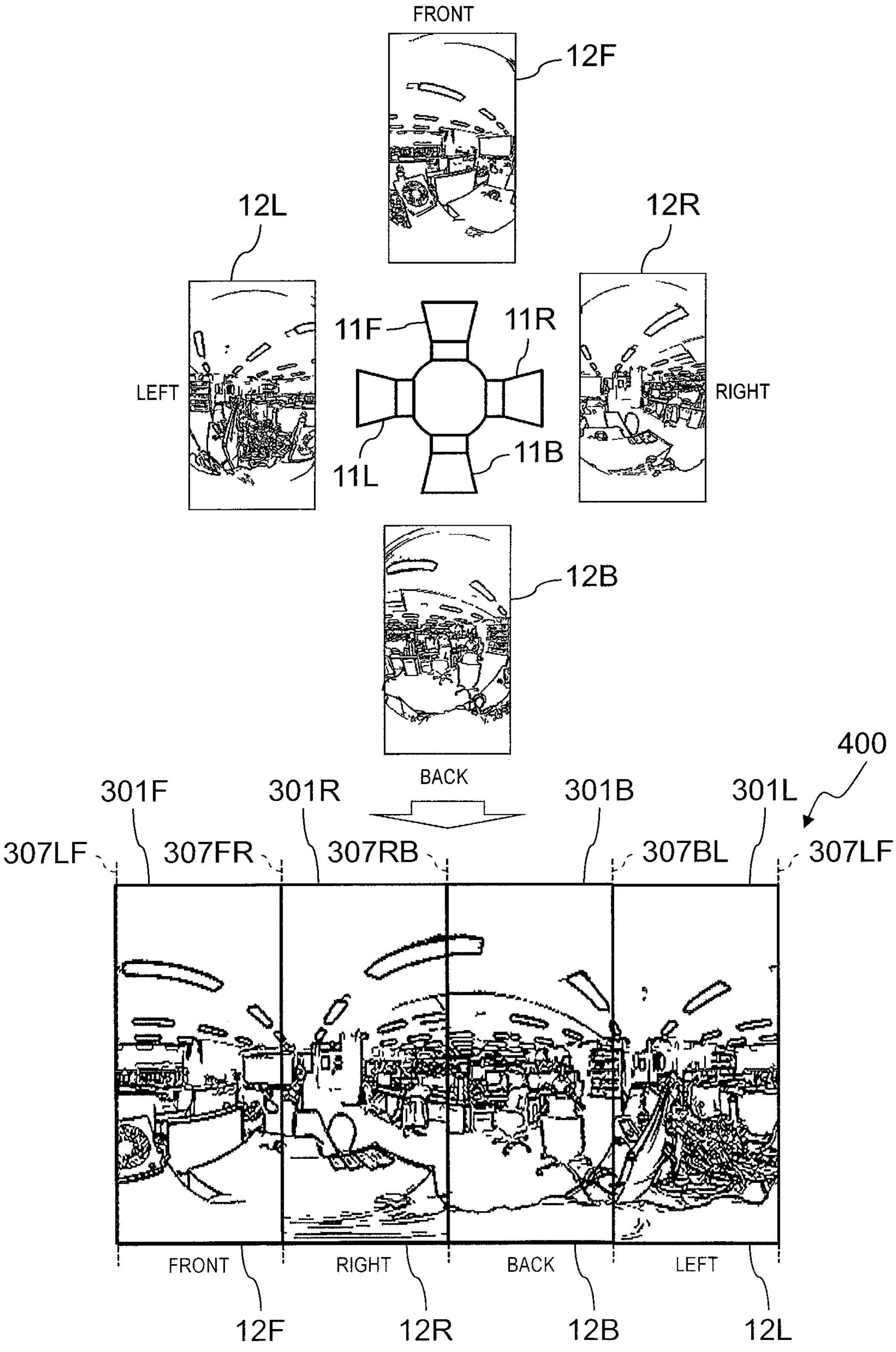
FIG. 3 is a schematic diagram for explaining a projection region.

As shown in FIG. 3, projection region setter 102 associates camera 11R that images the right side with projection region 301R on the right side of celestial sphere panoramic image 400. Similarly, projection region setter 102 associates cameras 11F, 11B, and 11L that image the front, the back, and the left sides, with projection regions 301F, 301B, and 301L on the front, the back, and the left sides of celestial sphere panoramic image 400, respectively.

Projection region setter 102 sets all projection regions 301 to be adjacent to each other in celestial sphere panoramic image 400, and boundary lines 307FR, 307RB, 307BL, and 307LF are formed between the front and the right sides, the right and the back sides, the back and the left sides, and the left and the front sides, respectively. Note that, FIG. 3 is an expanded view of celestial sphere panoramic image 400 connected on the left side and the front side, so boundary line 307LF is shown at both the right end and the left end of celestial sphere panoramic image 400. Boundary lines 307 are set to, for example, portions corresponding to the boundaries of projection regions 301. The width of each of projection regions 301 is, for example, a length obtained by equally dividing celestial sphere panoramic image 400 according to the number of cameras 11. However, depending on an angle of view and/or an installation angle of camera 11, the width of the projection region which each camera 11 takes charge of may be made uneven or variable.

Figure 4:
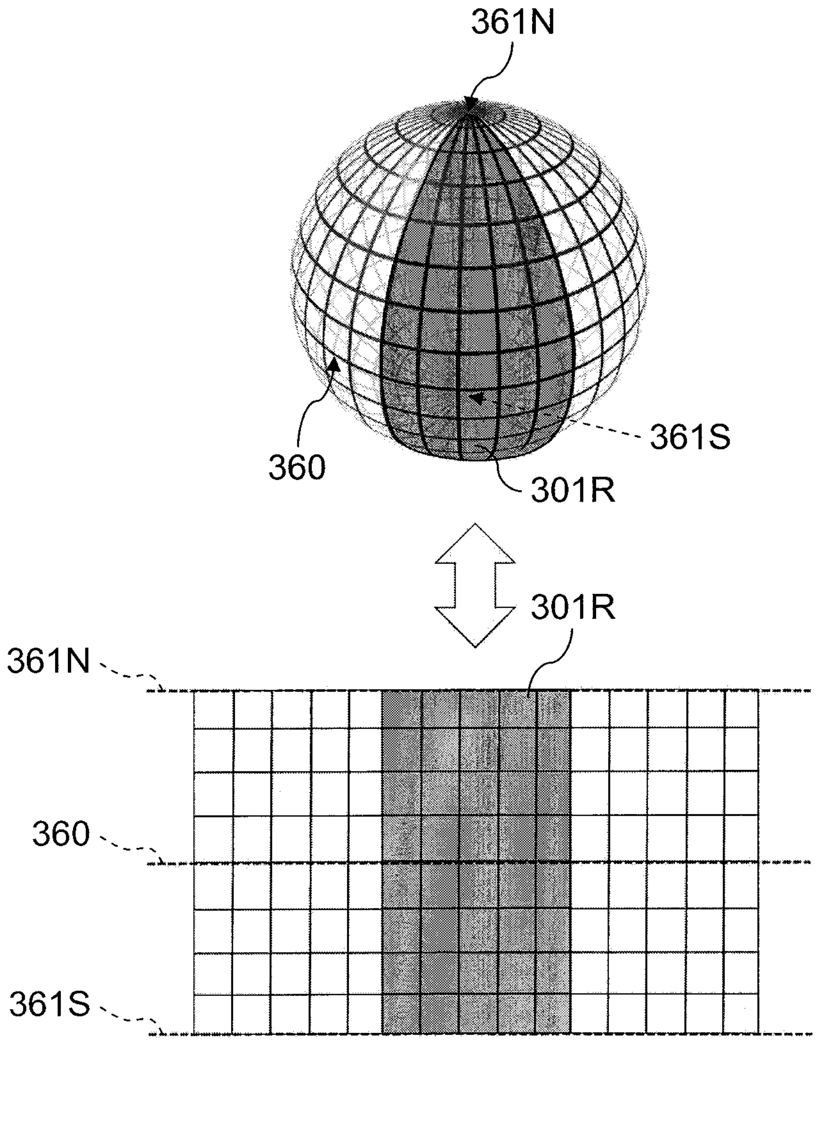
FIG. 4 is a schematic diagram for explaining a relationship between a celestial sphere surface region and the projection region.

As shown in FIG. 4, for example, projection region 301R on the right side corresponds to a region obtained by projecting a region on the right side of the celestial sphere surface on a plane. Therefore, coordinates in a horizontal direction in projection regions 301 can be represented by the longitude in the celestial sphere surface, and coordinates in a vertical direction in projection regions 301 can be represented by the latitude in the celestial sphere surface. In the present exemplary embodiment, a horizontal line corresponding to the latitude zero degree (equator) in projection regions 301 is referred to as equator line 360, and horizontal lines corresponding to the latitude ±90 degrees (upper polar point, lower polar point) in projection regions 301 are referred to as polar lines 361N and 361S.

<Details of Composite Region Setter>

Next, a specific example of the processing performed by composite region setter 103 will be described with reference to FIG. 5. The processing in the vicinity of the boundary between projection regions 301R and 301B will be described as a representative example, and the same processing is performed in the vicinity of the other boundaries.

Figure 5:
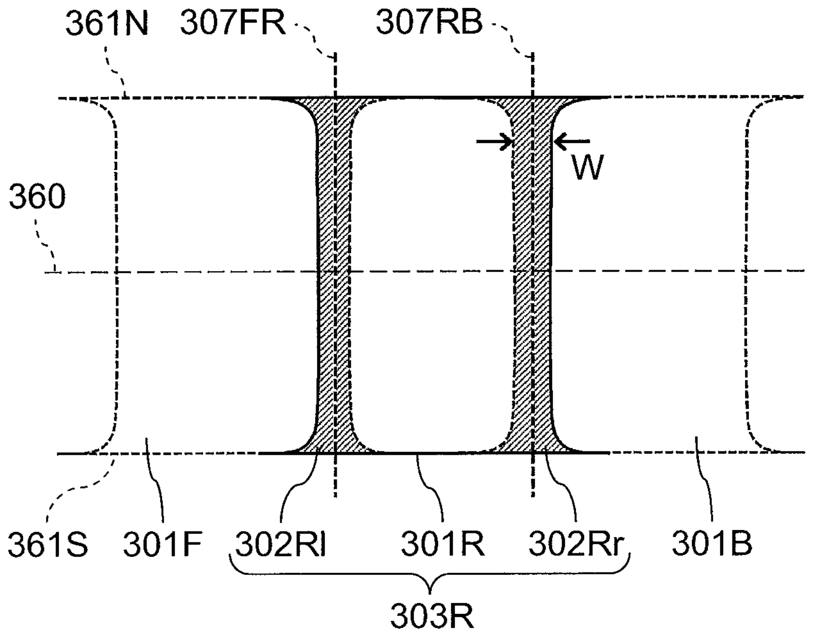
FIG. 5 is a schematic diagram for explaining a composite region.

As shown in FIG. 5, composite region setter 103 sets composite region 302Rr (slanted line portion) in the vicinity of boundary line 307RB between two adjacent projection regions 301R and 301B. Similarly, composite region 302R1 (slanted line portion) is set in the vicinity of boundary line 307FR between two adjacent projection regions 301F and 301R. In the present exemplary embodiment, projection region 301 and composite region 302 are combined and referred to as extended projection region 303. The width in a direction perpendicular to boundary line 307 in composite region 302 (that is, a direction parallel to the latitude line) is referred to as a composite width.

As described later, in image composer 105, the image processing is performed on the images within composite region 302 to make the seams of the images inconspicuous. Generally, in order to make the seams inconspicuous, a somewhat wide composite width is required, and if the composite width is too narrow, the seams become conspicuous. In the related art, since a constant composite width is set near the boundary line of the projection region, when viewed in the coordinates of the celestial sphere surface, the composite width in the vicinity of the polar point (arc length parallel to the latitude line) becomes considerably narrower than the composite width in the vicinity of the equator. Therefore, in the related art, there is a problem that seams are conspicuous in the celestial sphere panoramic image of a viewpoint in a polar point direction.

Composite region setter 103 sets composite region 302 such that composite width W becomes wider according to a reciprocal of a cosine function having the latitude θ as a variable. Specifically, composite region setter 103 sets composite region 302 such that composite width W=L/cos θ at latitude θ. Here, L is a constant and corresponds to a composite width at latitude θ=0 degree (that is, the equator). Composite width W is set to a predetermined maximum value so that composite width W does not become ∞ when latitude θ is ±90 degrees.

Composite width W described above is a value that narrows as it approaches 0 degree of the latitude (equator line 360), and widens as it approaches ±90 degrees of the latitude (polar lines 361N and 361S). As a result, since the composite width when viewed in the coordinates of the celestial sphere surface is sufficiently secured even in the vicinity of the polar point, the seams are not conspicuous in celestial sphere panoramic image 400 of the viewpoint in the polar point direction as well.

By using the cosine function, the composite width when viewed in the coordinates of the celestial sphere surface becomes approximately constant. Thereby, the seams are even more inconspicuous.

<Details of Image Projector>

Next, a specific example of the processing performed by image projector 104 will be described with reference to FIG. 6.

Figure 6:
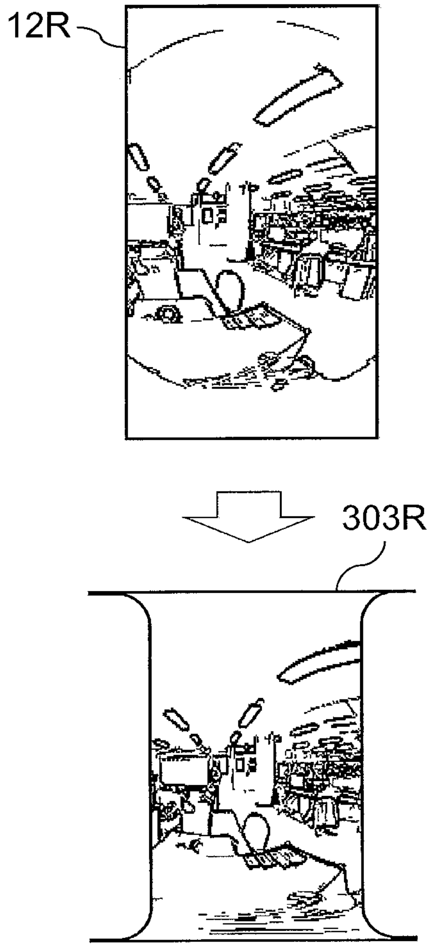
FIG. 6 is a schematic diagram for explaining a projection of a captured image onto an extended projection region.

As shown in FIG. 6, image projector 104 projects captured image 12R imaged by camera 11R with respect to extended projection region 303R including projection region 301R which is associated with camera 11R by the projection region setter 102. Specifically, image projector 104 maps each pixel of captured image 12R to the corresponding coordinates of extended projection region 303R.

The correspondence relationship between the pixels of captured image 12R and the coordinates in extended projection region 303R can be calculated based on internal parameters such as a focal distance and a distortion coefficient of camera 11R, and external parameters such as an orientation and a posture of camera 11R.

The pixel to be mapped to extended projection region 303R may be a complementary pixel generated using pixel values in captured image 12R and pixel values in the periphery thereof.

<Details of Image Composer>

Next, a specific example of the processing performed by image composer 105 will be described with reference to FIG. 7.

Figure 7:
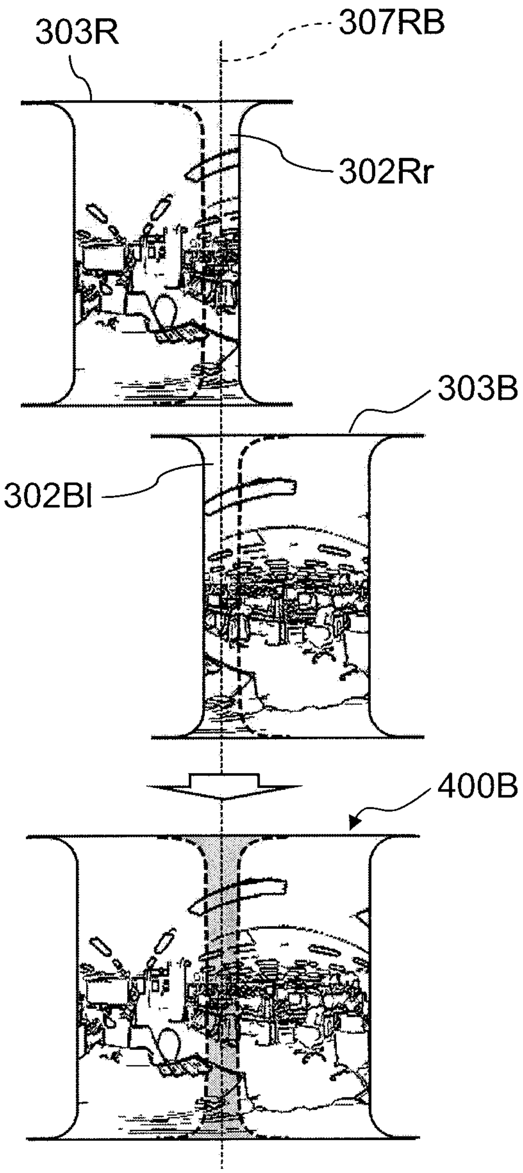
FIG. 7 is a schematic diagram for explaining composite processing.

As shown in FIG. 7, image composer 105 connects images mapped to adjacent expanded projection regions 303R and 303B, and generates celestial sphere panoramic image 400B. At this time, image composer 105 performs the composite processing on the images within composite regions 302Rr and 302B1, and makes the seams of the connection portions inconspicuous. For example, image composer 105 performs the alpha blending on the images within composite regions 302Rr and 302B1. Hereinafter, the processing of the alpha blending will be described.

Image composer 105 substitutes first pixel value $P_1$ within composite region 302Rr of extended projection region 303R and second pixel value $P_2$ within composite region 302B1 of extended projection region 303B into Equation 1 below, and calculates pixel value $P_r$ after the composition.

$$P_r = P_1 \times \alpha + P_2 \times (1 \cdot \alpha) \quad \text{(Equation 1)}$$

Figure 8:
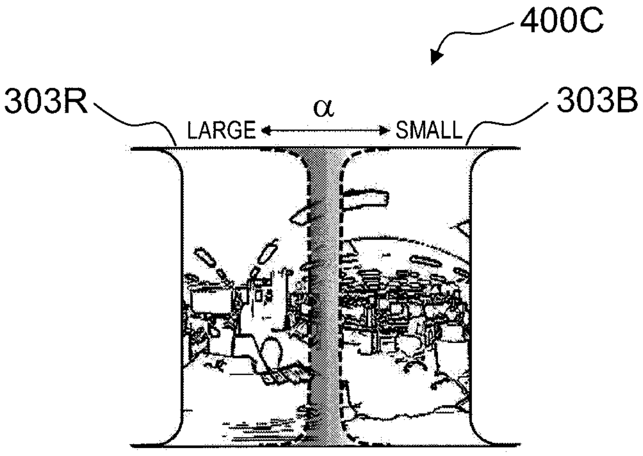
FIG. 8 is a schematic diagram for explaining an example of an alpha blending.

Here, α is a composite ratio of the first pixel value. Composite ratio α is a constant value for all pixel values in composite regions 302Rr and 302B1. However, as shown in FIG. 8, composite ratio α may be a value that becomes smaller as the distance from a center of expanded projection region 303R including first pixel value $P_1$ becomes larger.

When connecting images of three or more extended projection regions 303, image composer 105 repeats processing, where firstly, the alpha blending is performed on images within the composite region of the two extended projection regions and the images are connected, secondly, the alpha blending is performed on an image within another composite region of the connected extended projection region and on an image within a composite region of another one extended projection region and the images are connected, and then generates celestial sphere panoramic image 400C.

Figure 9:
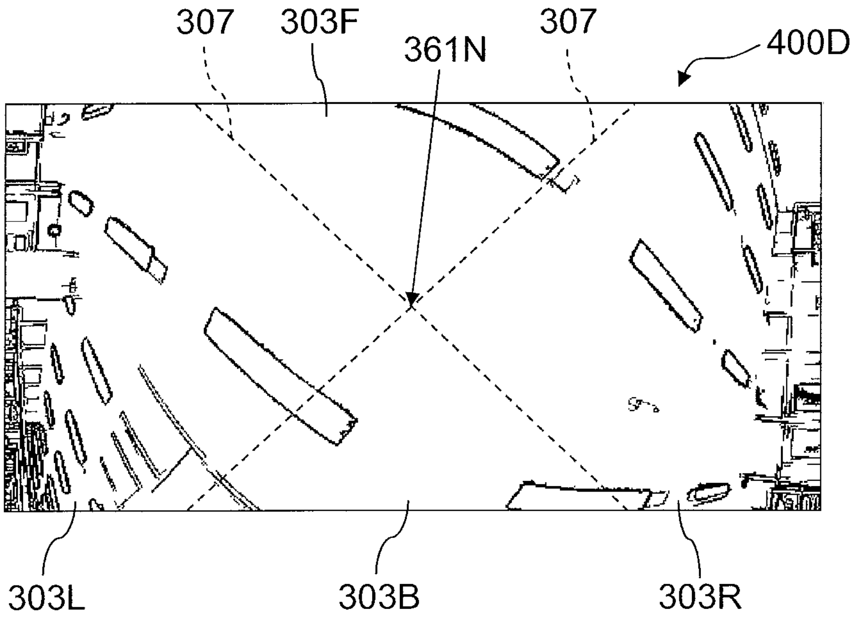
FIG. 9 is a schematic diagram showing an example of a celestial sphere panoramic image when a viewpoint is directed to a polar point.

Thus, by performing the alpha blending with a sufficient composite width in the vicinity of polar line 361, for example, as shown in FIG. 9, the seams of boundary lines 307 become inconspicuous even in celestial sphere panoramic image 400D of a viewpoint in a direction of polar point 361N.

<Processing Flow in Image Processing Apparatus>

Figure 10:
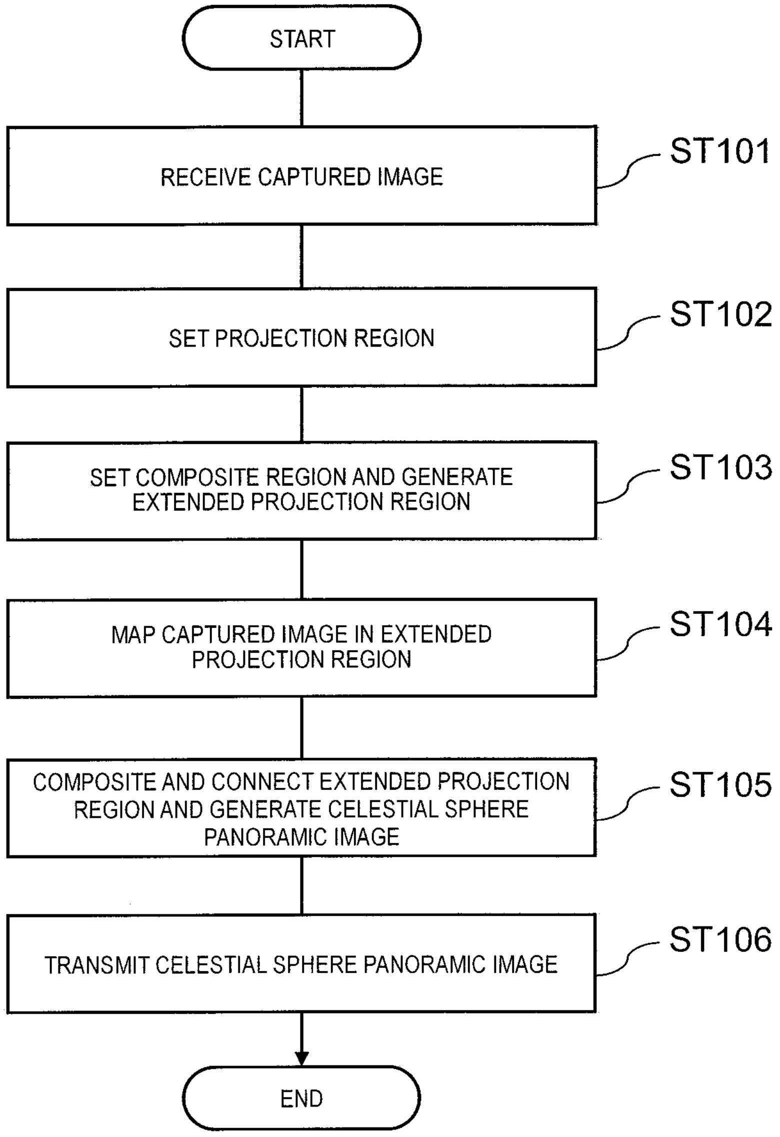
FIG. 10 is a flowchart showing overall processing in the image processing apparatus.

Next, the overall processing flow in image processing apparatus 20 will be described using the flowchart in FIG. 10.

First, image receiver 101 receives captured images 12 imaged by each camera 11 from image-capturing device 10, and stores the received respective captured images 12 in input buffer 201 (ST101).

Next, projection region setter 102 sets a correspondence relationship between camera 11 and projection region 301 (ST102).

Next, composite region setter 103 sets composite region 302 in the vicinity of boundary line 307 of projection region 301, and generates extended projection region 303 (ST103).

Next, image projector 104 maps captured images 12 imaged by camera 11 in extended projection region 303 which is in a correspondence relationship with camera 11 (ST104).

Next, image composer 105 performs the composite processing on the images within the composite region of extended projection region 303 to connect the images, thereby generating celestial sphere panoramic image 400, and the generated celestial sphere panoramic image 400 is stored in output buffer 202 (ST105).

Next, image transmitter 106 transmits celestial sphere panoramic image 400 stored in output buffer 202 to display device 30 (ST106). Thereby, celestial sphere panoramic image 400 is displayed on display device 30.

<Modification Example of Projection Region>

Next, a modification example of the projection region will be described.

Figure 11:
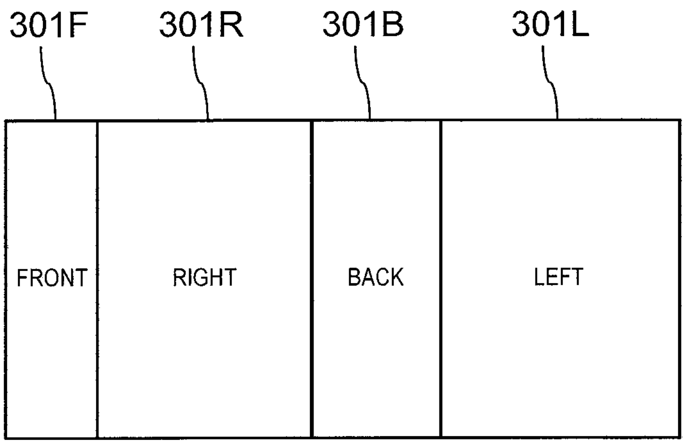
FIG. 11 is a schematic diagram for explaining a modification example of a projection region.

(A1) When the distance between adjacent cameras 11 and/or the angle of view of cameras 11 are different, projection region setter 102 sets each of projection regions 301 to different sizes as shown in FIG. 11. At this time, projection region setter 102 determines the size of projection region 301 in accordance with the distance between adjacent cameras 11 and/or the angle of view of cameras 11. Specifically, when the distance between the adjacent cameras 11 is large and/or the angle of view of cameras 11 is large, the size of projection region 301 is set large.

Figure 12:
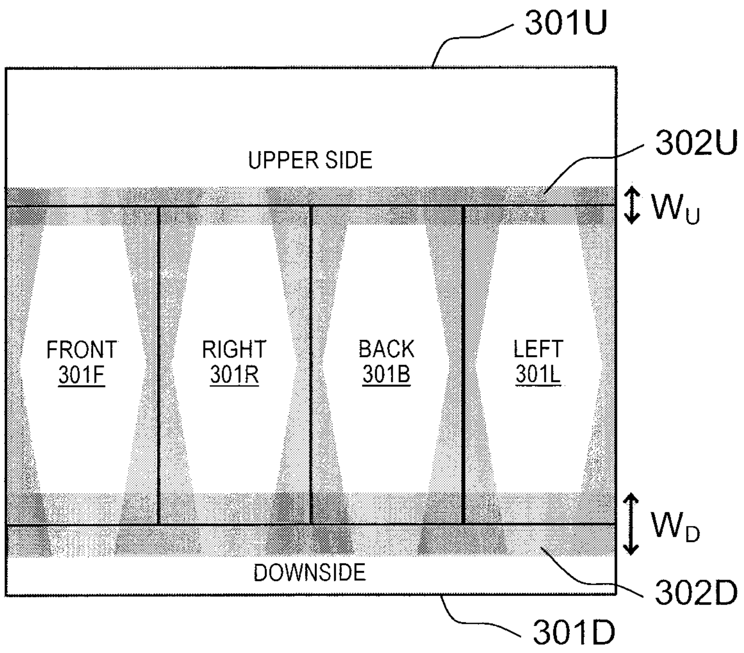
FIG. 12 is a schematic diagram for explaining a modification example of a projection region.

(A2) When image-capturing device 10 further includes camera 11 for imaging the upper and lower sides, projection region setter 102, as shown in FIG. 12, provides projection region 301U, which is associated with camera 11 for imaging the upper side, above front-back-left-right projection region 301, and provides projection region 301D, which is associated with camera 11 for imaging the downside, below front-back-left-right projection region 301. In this case, as shown in FIG. 12, composite region setter 103 provides composite region 302U near the boundary lines between front-back-left-right projection region 301 and upper side of projection region 301U, and provides composite region 302D near the boundary lines between front-back-left-right projection region 301 and downside of projection region 301D. Further, as shown in FIG. 12, when the downside of projection region 301D is smaller than the upper side of projection region 301U, the boundary line of the downside of projection region 301D is closer to the polar line than the boundary line of the upper side of projection region 301U (that is, the distance from the equator line is far). Therefore, in this case, composite width $W_D$ of composite region 302D, which is near the boundary line with the downside of projection region 301D, is made wider than composite width $W_U$ of composite region 302U, which is near the boundary line with the upper side of projection region 301U.

Since a space in a direction parallel to the longitude line in a celestial sphere surface coordinate system is constant regardless of a distance to the polar point, as described in (A2), even if the composite width (for example, $W_U$ and $W_B$) between the upper-lower captured image and the front-back-left-right captured image is expanded as the distance to polar line 361 becomes shorter, the effect of smoothing the direction parallel to the longitude line of celestial sphere panoramic image 400 is small. However, since the narrowing of the space in the direction parallel to the latitude line becomes steeper as it gets closer to the polar point, even if the composite width of the front-back-left-right captured image is adjusted, the seams become less likely to be smooth as the distance to the polar line is shorter. Therefore, as described in (A2), as for the composite width (for example, $W_U$ and $W_B$) between the upper-lower captured image and the front-back-left-right captured image, the seams in the direction parallel to the latitude line in the vicinity of polar line 361 can be made more inconspicuous by increasing the composite width as the distance to polar line 361 gets closer.

<Modification Example of Composite Region>

Next, a modification example of the composite region will be described.

Figure 13:
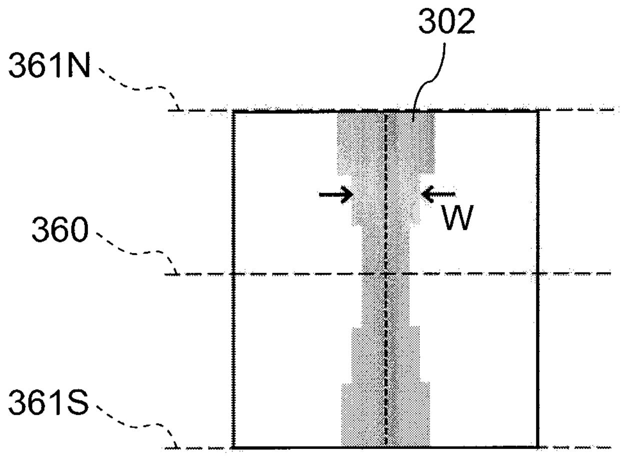
FIG. 13 is a schematic diagram for explaining a modification example of a composite region.

(B1) As shown in FIG. 13, composite region setter 103 sets composite region 302 in which composite width W is the smallest on equator line 360 and gradually widens toward polar lines 361N and 361S.

Figure 14:
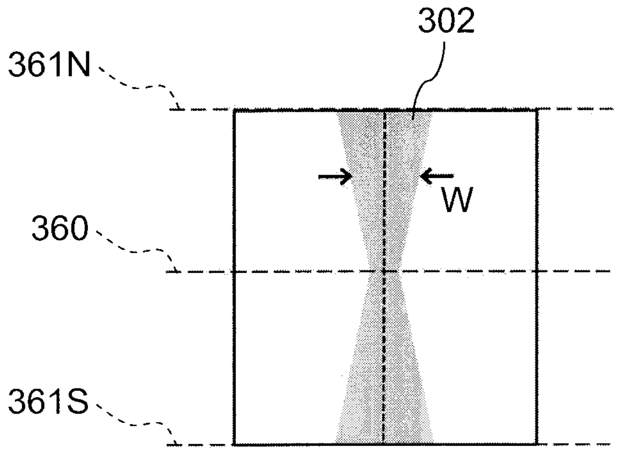
FIG. 14 is a schematic diagram for explaining a modification example of a composite region.

(B2) As shown in FIG. 14, composite region setter 103 sets composite region 302 in which composite width W is the smallest on equator line 360 and widens at a constant rate toward polar lines 361N and 361S.

(B3) For example, when the celestial sphere panoramic image of the viewpoint in the lower polar point direction is not displayed, for example, when the image-capturing device 10 is installed on a tripod for imaging, composite region setter 103 sets only the composite width in the vicinity of the upper polar line 361N to a large value. Further, for example, when the celestial sphere panoramic image of the viewpoint in the upper polar point direction is not displayed, for example, when the image-capturing device 10 is installed on a hanging rod for imaging, composite region setter 103 sets only the composite width in the vicinity of the lower polar line 361S to a large value.

(B4) Composite region setter 103 sets the composite width in accordance with a difference between the images within an overlapping image-captured range in two captured images 12 imaged by adjacent cameras 11. Specifically, composite region setter 103 sets the composite width wider in order to smooth the seams as the difference between the images within the overlapping image-captured range is larger.

(B5) Generally, the seams become smoother as the composite width is set wider, but the arithmetic operation amount increases accordingly, and the processing load of image processing apparatus 20 increases. Therefore, composite region setter 103 determines the composite width in accordance with the high-low level of the arithmetic operation capability of image processing apparatus 20. Specifically, composite region setter 103 sets the composite width narrower as the arithmetic operation capability of image processing apparatus 20 is lower. The arithmetic operation capability of image processing apparatus 20 is calculated, for example, by the maximum operation frequency of the processor and/or the current usage rate of the processor.

<Effect of Present Exemplary Embodiment>

As described above, when image processing apparatus 20 connects a plurality of captured images 12 imaged by a plurality of cameras 11 to generate celestial sphere panoramic image 400, image processing apparatus 20 sets a composite width in the vicinity of polar line 361 wider than a composite width in the vicinity of equator line 360. As a result, even in celestial sphere panoramic image 400 of a viewpoint in a polar point direction, seams are not conspicuous. Further, by setting the composite width in this manner, it is possible to reduce an arithmetic operation amount of composite processing as compared with a case where the entire composite width is set wide.

<Hardware Configuration>

Figure 15:
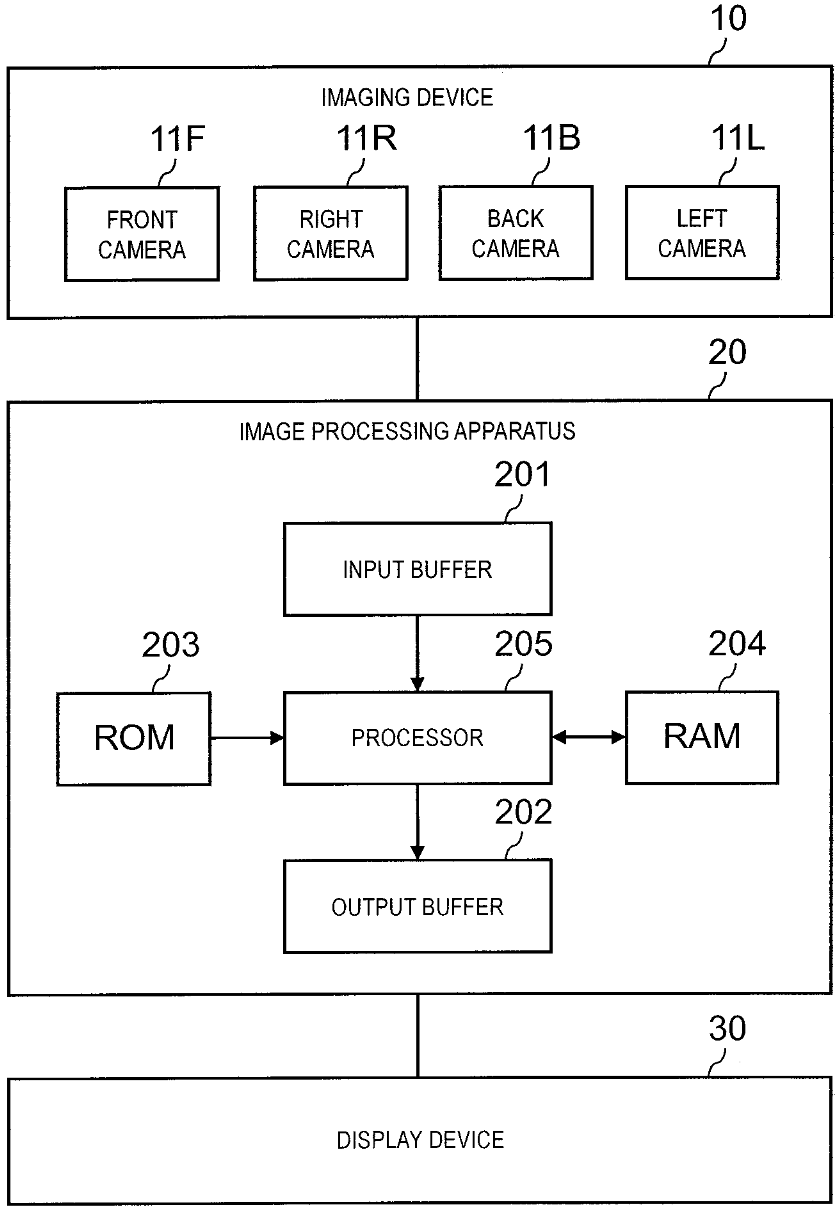
FIG. 15 is a block diagram showing an example of a hardware configuration of the image processing apparatus.

Next, a hardware configuration of image processing apparatus 20 will be described with reference to FIG. 15.

Image processing apparatus 20 includes input buffer 201, output buffer 202, ROM 203, RAM 204, and processor 205.

Input buffer 201 is a storage device for storing data of captured image 12 transmitted from image-capturing device 10 as described above. Input buffer 201 is configured of, for example, a volatile semiconductor memory.

ROM 203 is a storage device for storing programs executed by processor 205 and various data. ROM 203 is configured of, for example, a non-volatile semiconductor memory. RAM 204 is a storage device for storing various data utilized by processor 205. RAM 204 is configured of, for example, a volatile semiconductor memory.

Processor 205 is, for example, a processor such as a central processing unit (CPU), a graphics processing unit (GPU), or a digital signal processor (DSP). The functions of image processing apparatus 20 are realized by processor 205 in accordance with the program stored in ROM 203. The functions of image receiver 101, projection region setter 102, composite region setter 103, image projector 104, image composer 105, and image transmitter 106 illustrated in FIG. 2, are realized by, for example, processor 205.

Output buffer 202 is a storage device for storing data of celestial sphere panoramic image 400 generated by processor 205. Output buffer 202 is configured of, for example, a volatile semiconductor memory. Celestial sphere panoramic image 400 stored in output buffer 202 is output to display device 30.

<Note>

In the above exemplary embodiment, captured images 12 imaged by fisheye lens are described as examples in the drawings, but the scope of application of the present exemplary embodiment is not limited to this. That is, the present exemplary embodiment is also applicable to captured images imaged other than the fisheye lens, as long as the image includes the vicinity of the polar point in the image-captured range. Also in this case, as shown in FIG. 4, in the viewpoint in the polar point direction of the celestial sphere panoramic image obtained by composing the captured images, the vicinity of the polar point is integrated into coordinates of one point, and the composite width projected on the celestial sphere panoramic image also becomes narrow accordingly. This phenomenon has nothing to do with the type of lens used to image the captured image 12, and occurs when the captured image is projected onto the celestial sphere surface. That is, the content of the present exemplary embodiment is to suppress the seams from being conspicuous due to the phenomenon. Therefore, as long as the celestial sphere panoramic image is generated by composing the captured images, the seams can be smoothed by applying the present exemplary embodiment regardless of the type of lens used for imaging. The configuration which images in the vicinity of the polar point using a normal lens can be realized by inclining camera 11 in a direction corresponded to the polar point, for example.

Further, in the above exemplary embodiment, the composite width symmetrical about boundary line 307 is set, but the setting method of the composite width is not limited to this. For example, the composite width that is asymmetric with respect to boundary line 307 may be set. That is, the composite width according to the present exemplary embodiment may be any shape as long as the vicinity of the polar point is set to be wider than the vicinity of the equator.

Further, in the above exemplary embodiment, the composite width is set based on a position of boundary line 307, but the setting method of the composite width is not limited to this. That is, the composite width may be set for a portion where the image-captured ranges overlap between cameras 11, and the composite width may not necessarily be set based on boundary line 307. For example, the overlapping range of each captured image 12 is specified from the image-captured range and the installation position of camera 11, and the composite width is set based on a center position of the specified overlapping range or a position of a predetermined ratio. Thus, the content of the present exemplary embodiment can be realized without setting boundary line 307 itself.

Each function block employed in the description of the above exemplary embodiment may typically be realized as an LSI constituted by an integrated circuit. These may be individually made into one chip, or may be made into one chip so as to include some or all. Although it is referred to as an LSI, it may be referred to as an IC, a system LSI, a super LSI, or an ultra LSI depending on the degree of integration.

Further, the method of circuit integration is not limited to the LSI, and may be realized with a dedicated circuit or a general purpose processor. After the LSI is manufactured, a field programmable gate array (FPGA) that can be programmable, or a reconfigurable processor that can reconfigure connection and setting of circuit cells in the LSI, may be utilized.

Furthermore, if integrated circuit technology comes out to replace the LSI as a result of the advancement of semiconductor technology or a derivative other technology, it is naturally also possible to carry out function block integration using the technologies. The application of biotechnology or the like may be possible.

The above-described exemplary embodiment is an example for describing the present disclosure, and the scope of the present disclosure is not limited to the exemplary embodiment. Those skilled in the art can practice the present disclosure in various other aspects without departing from the scope of the present disclosure.

INDUSTRIAL APPLICABILITY

The image processing apparatus and the image processing method according to the present disclosure can be applied to the composition of a plurality of image data imaged by a plurality of cameras.

REFERENCE MARKS IN THE DRAWINGS

10 IMAGE-CAPTURING DEVICE
11 CAMERA
20 IMAGE PROCESSING APPARATUS
30 DISPLAY DEVICE
101 IMAGE RECEIVER
102 PROJECTION REGION SETTER
103 COMPOSITE REGION SETTER
104 IMAGE PROJECTOR
105 IMAGE COMPOSER
106 IMAGE TRANSMITTER
201 INPUT BUFFER
202 OUTPUT BUFFER

The invention claimed is:

1. An image processing apparatus that generates a celestial sphere panoramic image by connecting a plurality of captured images to one another of which image-captured ranges partially overlap one another, the apparatus comprising:

a processor that performs operations comprising:

setting a composite region in an overlapping range where at least two captured images overlap each other, wherein the composite region is set such that a portion projected in the vicinity of a polar point of the celestial sphere panoramic image is wider than a portion projected in the vicinity of an equator of the celestial sphere panoramic image, a margin between the composite region and the overlapping range is wider in the vicinity of the equator than in the vicinity of the polar point, and the composite region is different from the overlapping range;

performing composite processing on the overlapping images in the composite region, and not performing the composite processing on the overlapping images in the overlapping range other than the composite region; and connecting the plurality of captured images to one another, and generating the celestial sphere panoramic image.

2. The image processing apparatus of claim 1, wherein in the plurality of captured images, the at least two captured images in the overlapping range overlap one another in a direction substantially parallel to the equator, and wherein the processor sets the composite region such that a composite width of a portion projected in the vicinity of the polar point of the overlapping range is wider than a composite width of a portion projected in the vicinity of the equator of the overlapping range, in the direction substantially parallel to the equator.

3. The image processing apparatus of claim 2, wherein the processor sets the composite region such that the composite width becomes wider from the portion projected to the equator toward the portion projected to the polar point.

4. The image processing apparatus of claim 3, wherein the processor sets the composite region such that the composite width becomes wider in proportion to a reciprocal of a cosine function having a latitude as a variable.

5. The image processing apparatus of claim 1, wherein, in the plurality of captured images, the at least two captured images in the overlapping range overlap one another in a direction substantially perpendicular to the equator, and wherein the processor sets the composite region such that a composite width of a portion projected in the vicinity of the polar point of the overlapping range is wider than a composite width of a portion projected in the vicinity of the equator of the overlapping range, in the direction substantially perpendicular to the equator.

6. The image processing apparatus of claim 2, wherein the processor determines the composite width in accordance with a high-low level of an arithmetic operation capability.

7. An image processing method for generating a celestial sphere panoramic image by connecting a plurality of captured images to one another of which image-captured ranges partially overlap one another, the method comprising:

setting a composite region in an overlapping range where at least two captured images overlap each other, wherein the composite region is set such that a portion projected in the vicinity of a polar point of the celestial sphere panoramic image is wider than a portion projected in the vicinity of an equator of the celestial sphere panoramic image, a margin between the composite region and the overlapping range is wider in the vicinity of the equator than in the vicinity of the polar point, and the composite region is different from the overlapping range; and performing composite processing on the overlapping images in the composite region, and not performing the composite processing on the overlapping images in the overlapping range other than the composite region; and connecting the plurality of captured images to one another, and generating the celestial sphere panoramic image.

8. The image processing apparatus of claim 1, wherein the processor sets a predetermined maximum value of a width of the composite region in a direction substantially parallel to the equator of the celestial sphere panoramic image, and the processor sets the composite region by setting a polar composite width to the predetermined maximum value, the polar composite width being the width of the composite region at the polar point.

9. The image processing apparatus of claim 8, wherein the processor sets the composite region by calculating $W=L/\cos\theta$, and the processor sets W to the predetermined maximum value when θ is ±90 degrees, regardless of the calculated value of $L/\cos\theta$, so that W does not become infinite when θ is ±90 degrees, where θ indicates a latitude of the celestial sphere panoramic image, W indicates a composite width at latitude θ, and L indicates a constant value corresponding to the composite width at latitude $\theta=0$.

10. The image processing apparatus of claim 1, wherein the processor sets the composite region by setting a polar composite width smaller than a width of the overlapping range at the polar point in a direction substantially parallel to the equator of the celestial sphere panoramic image, the polar composite width being a width of the composite region at the polar point in the direction substantially parallel to the equator of the celestial sphere panoramic image.

11. The image processing apparatus of claim 7, further comprising setting a predetermined maximum value of a width of the composite region in a direction substantially parallel to the equator of the celestial sphere panoramic image, wherein the composite region is set by setting a polar composite width to the predetermined maximum value, the polar composite width being the width of the composite region at the polar point.

12. The image processing method of claim 11, wherein the composite region is set by calculating $W=L/\cos\theta$, and W is set to the predetermined maximum value when θ is ±90 degrees, regardless of the calculated value of $L/\cos\theta$, so that W does not become infinite when θ is ±90 degrees, where θ indicates a latitude of the celestial sphere panoramic image, W indicates a composite width at latitude θ, and L indicates a constant value corresponding to the composite width at latitude $\theta=0$.

13. The image processing method of claim 7, wherein the composite region is set by setting a polar composite width smaller than a width of the overlapping range at the polar point in a direction substantially parallel to the equator of the celestial sphere panoramic image, the polar composite width being a width of the composite region at the polar point in the direction substantially parallel to the equator of the celestial sphere panoramic image.

14. The image processing apparatus according to claim 1, wherein the composite region at the polar point is wider than any other portion of the composite region between the polar point and the equator.

15. The image processing apparatus according to claim 1, wherein the composite region at the polar point is wider than any other portion of the composite region between the polar point and the equator.

* * * * *